INVENTOR.
*John L. Vossen Jr.*
BY

ATTORNEY

July 31, 1973   J. L. VOSSEN, JR   3,749,658
METHOD OF FABRICATING TRANSPARENT CONDUCTORS
Filed March 29, 1972   2 Sheets-Sheet 2

INVENTOR.
John L. Vossen Jr.
BY
ATTORNEY

United States Patent Office 3,749,658
Patented July 31, 1973

3,749,658
METHOD OF FABRICATING TRANSPARENT CONDUCTORS
John Louis Vossen, Jr., Bedminster, N.J., assignor to RCA Corporation
Original application Jan. 2, 1970, Ser. No. 295. Divided and this application Mar. 29, 1972, Ser. No. 239,364
Int. Cl. C23c *15/00*
U.S. Cl. 204—192               4 Claims

ABSTRACT OF THE DISCLOSURE

A sputtering target of 80 mole percent indium oxide and 20 mole percent tin oxide is radio-frequency sputter deposited on a substrate in an inert gas atmosphere to provide a high conductivity, anion deficient, tin doped $In_2O_3$ film. The film is then heated in an oxygen atmosphere for a period of time sufficient to form a stoichiometric, anion-full, oxide layer on the surface of the film; where the thickness of the oxide layer is self-limiting with temperature so that the remainder of the anion deficient, high conductivity film under the oxide layer is not oxidized with future operation of the film in an oxidizing atmosphere at all lower temperatures.

---

This is a division of application Ser. No. 295, filed Jan. 2, 1970, now abandoned.

BACKGROUND OF THE INVENTION

This invention relates to optical films. More particularly, this invention relates to a method of depositing a stable, low resistivity, transparent conducting film having particular utility in liquid crystal displays.

Liquid crystal displays require a transparent conducting layer to be uniformly deposited on a substrate over very large areas. The requirements of these films are very stringent. Typically, they must have an 80% minimum optical transmission in the region between 4600 A. and 7200 A., they must have a surface resistivity less than 200 ohms/square; they must be deposited uniformly over substrates as large as 12 x 12 inches or larger within an accuracy of ±10%, and the surface must be sufficiently smooth that no surface roughness or crystallinity should be visible when viewed at 500 times magnification in a scanning electron microscope. Additionally, the above-mentioned requirements must not change with future operation of the display.

Heretofore, transparent conductors have been made which possess one or more of the above desired properties; however, none of the prior art methods has adequately produced films having all of the above requirements. Sputter deposition of metals has produced films having excellent conductivities; however, these films have had very poor optical transmissions, and to deposit films of a sufficient thickness for electrical conduction, the thickness was such that they had a very low optical transmission. Sputter deposition of semiconducting metal-oxide films has been the optimum method, and it has produced films with adequate transmission, uniformity and surface smoothness; however, the conductivity of these films has not been as good as desired for liquid crystal displays.

Two methods have been used for increasing the conductivity of these semiconducting metal-oxide films. First, it is well known that a defect structure produced by creating anion vacancies in the film can increase the conductivity of certain semiconducting oxides by several orders of magnitude. In particular, the anion vacancies can be created by chemical reduction where the reduction produces a non-stoichiometric composition which is oxygen deficient. However, upon exposure to an oxygen atmosphere over a long period of time, there is a gradual re-oxidation of the film which annihilates the oxygen vacancies, and the film eventually returns to a stoichiometric (or low conductivity) form. As a result, it has not been possible to produce an anion deficient film which did not later return to its stoichiometric, low conductivity form; and thus, the films were unstable and were not suitable for liquid crystal displays.

A second method for increasing the conductivity of these films has been donor doping. In this method, donor atoms with an excess of electrons are substitutionally placed in the metal-oxide lattice, whereby the extra electrons will increase the conductivity by as much as several orders of magnitude. These films are stable; however, they still do not have a sufficient conductivity for liquid crystal displays. The best of these films has been an antimony doped tin oxide film, where the antimony replaced the tin in the tin oxide lattice. With an 80% transmission, these films have attained a resistivity of about 500 ohms/square; however, this is still more than twice the maximum resistivity desired for the liquid crystal display.

Heretofore, the metal-oxide films have been deposited by reactive DC sputtering. In this process, a metal alloy target, made of the film metal and the doping metal, is DC sputtered in an oxygen atmosphere so that the sputtered metal is oxidized as it is deposited, and thus forms a donor doped metal-oxide. However, this method has a number of disadvantages. First, it has been extremely difficult to control the dopant concentration of the deposited films. This is because the metal alloy target becomes very hot during sputtering and diffusion of the two metals within the target causes the relative concentration of the sputtered metals to vary widely. This is particularly true when the two metals form a low melting and/or eutectic alloy. Second, it is also difficult to accurately adjust the proper amount of oxygen in the system to control the amount of reactive oxidation of the sputtered metal during deposition. Additionally, the heating of the target during sputtering causes the target to spatter drops of metal onto the substrate which can be as large as several mils in diameter. This is especially true with low melting point metals, and results in the additional problem of destroying the surface uniformity. The smoothness of the films in liquid crystal displays is quite critical because another conducting plate is usually placed parallel to the transparent conductor about 0.5 mil away, and it is highly critical that there are not high field points on the transparent conductor which will arc or short the two plates together.

SUMMARY OF THE INVENTION

An anion deficient, donor doped $In_2O_3$ film is deposited upon a substrate. The film is then heated in an oxygen atmosphere to form a stoichiometric oxide layer on the surface of the film, where the thickness of the oxide layer is self-limiting with the heating temperature.

DESCRIPTION OF THE PREFERRED EMBODIMENTS

Figure 1:
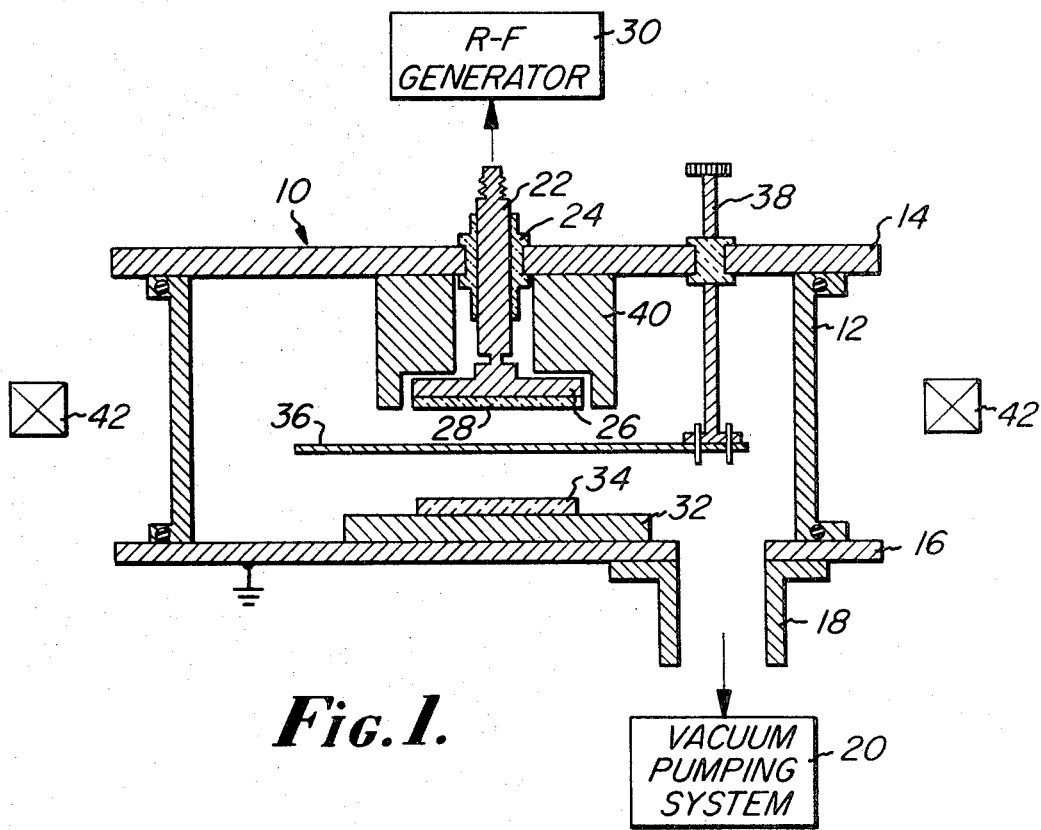
FIG. 1 is a cross-sectional view illustrating typical apparatus which may be used in the present invention.

FIG. 1 is a cross-sectional view of typical apparatus which may be used in depositing a transparent conducting film of the present invention. The deposition is performed in a vacuum system 10 which comprises a cylindrical container 12 and upper and lower base plates 14 and 16. The vacuum system 10 is evacuated by means of a flanged opening 18 in the base plate 16 which is connected to a vacuum pumping system 20. A radio-frequency feedthru 22 is inserted into the vacuum system 10 through the upper base plate 14. The feedthru 22 is held in place by a glazed steatite insulator 24 which makes a vacuum tight fit with the base plate 14. The feedthru 22 is an irregularly shaped metal stud having a bottom end which is connected to a backing plate 26 and a sputtering target 28. The other end of the feedthru 22 is electrically connected to a radio-frequency generator 30. A mounting block 32 is placed on the base plate 16 so that a substrate 34 may be placed on the block 32 beneath the target 28. A shutter 36 is attached to a push-pull rotary support 38, so that the shutter 36 may be interposed between the target 28 and the substrate 34 when it is desired to sputter the target 28 without affecting the substrate 34. A grounded shield 40 is placed around the feedthru 22 and the backing plate 26 to prevent the glow discharge from occurring in these areas. When small diameter targets 28 and substrates 34 are employed, a magnetic field coil 42 may be placed around the cylinder 12 to increase the RF glow discharge ion density and concentrate it toward the center of the system.

Example I

Figure 2:
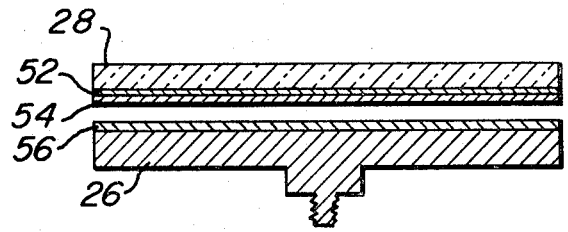
FIG. 2 is an exploded, cross-sectional view of the target and backing plate assembly of FIG. 1.

In this example, a sputtering target 28 is prepared comprising a mixture of $In_2O_3$ and $SnO_2$. FIG. 2 is an exploded, cross-sectional view of the target 28 and backing plate 26 assembly used in the present example. The target 28 is prepared by hot-pressing a powdered mixture of $In_2O_3$ and $SnO_2$. This is done by placing the mixture in a carbon die of the desired target size and shape, and then applying a combination of heat and pressure to form the target 28. The back side of the target 28 is then coated with a ceramic metal paste, in this case made of silver and glass frit, and fired at a high temperature to form a ceramic-metal layer 52. The layer 52 is then coated with a layer of solder 54. Although a number of different solders may be used, an indium-tin solder is used in this example to match the composition of the target 28 so that even if part of the solder layer 54 is sputtered, the same elements will be deposited upon the substrate 34. The backing plate 26 is fabricated out of aluminum and is selected to have the same shape as the target 28. A nickel layer 56 is then deposited on the face of the backing plate 26 by electroplating; and the plate 26 is then heated to sinter the nickel to the aluminum. The soldered surface 54 of the target 28 is then placed on the nickel surface 56 of the backing plate 26 and the two plates are soldered together by heating them to a temperature of about 215° C. The finished unit is then connected to the feedthru 22 in the vacuum chamber 10 as shown in FIG. 1.

Figure 3:
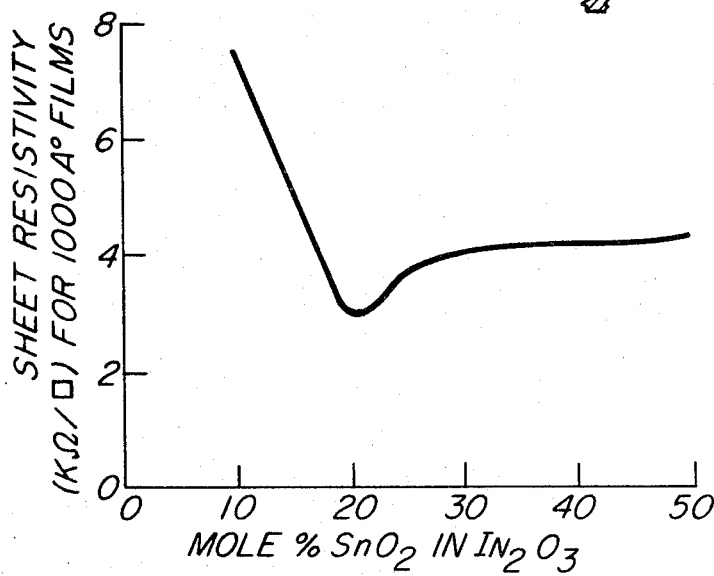
FIG. 3 is a graph which plots the sheet resistivity of a stoichiometric, tin doped $In_2O_3$ film as a function of the $SnO_2$ dopant concentration.

The target is primarily made of $In_2O_3$, and the $SnO_2$ is added to increase the conductivity of the film. The tin serves as a donor dopant which is substitutionally located in the $In_2O_3$ lattice. First, the concentration of the $SnO_2$ was selected to obtain the optimum conductivity of the film. In particular, the optimum concentration was determined by sputtering $In_2O_3$ films of various $SnO_2$ concentrations in an oxygen atmosphere to obtain fully oxidized, stoichiometric films; where any increase in conductivity was due strictly to the donor dopant. FIG. 3 is a graph which plots the sheet resistivity of such a stoichiometric $In_2O_3$ film 1000 A. thick as a function of the mole percentage of $SnO_2$ present in the mixture. Thus, as shown in FIG. 3, the optimum donor dopant conductivity is obtained with a sputtering target made of 80 mole percent $In_2O_3$ and 20 mole percent $SnO_2$.

A substrate 34 is then positioned on the mounting block 32 under the target 28. For the purposes of uniformity and speed of deposition, the substrate 34 surface should be smaller than the target 28 surface; otherwise, the target 28 must be rotated around the substrate 34 to insure an even deposition across the substrate 34 surface. The present example uses a circular target 28 about 2.75 inches in diameter and a two inch square substrate 34. The substrate 34 is made of glass, and is polished to have a smooth and clean surface so that it may be used in liquid crystal displays which require another plate to be placed parallel to it and in very close proximity with it, usually about 0.0005 inch away. It is preferred that for substrates 34 of the present size or larger, they should first be cleaned in methyl alcohol and vapor degreased in trichlorotrifluoro-ethane, and then placed on the mounting block 32.

The vacuum system 10 is then evacuated by means of the vacuum pumping system 20 to a pressure less than $5 \times 10^{-6}$ torr, and the shutter 36 is interposed between the target 28 and the substrate 34. A partial pressure of an inert gas is then admitted to the vacuum system 10. In the present example, argon gas is used at a pressure of 30 millitorr.

The target 28 is then sputtered to cleanse the target surface while the shutter 36 is closed to prevent deposition of the sputtered material on the substrate 34. The target 29 is sputtered by connecting it to the radio-frequency generator 30 so that a pulsating negative DC potential is applied to the target surface 28. As long as the surface of the target 28 remains at a negative potential with respect to the remainder of the vacuum system 10, the target 28 will be ion-bombarded by the argon ions, which will in turn sputter the material from the surface of the target 28.

Figures 4A, 4B:
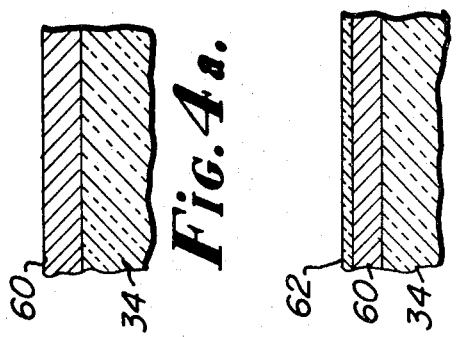
FIGS. 4a and 4b are schematic, cross-sectional views of a transparent film of the present invention before and after annealing.

When the impurities have been sputtered from the surface of the target 28, the shutter 36 is opened and the target 28 material is sputter-deposited upon the substrate 34 by the inert gas ions. The inert gas ions serve to chemically reduce the sputtered material by removing a percentage of the oxygen atoms from the sputtered material so that it deposits on the substrate 34 as an aniondeficient, tin-doped $In_2O_3$ film 60, as shown in FIG. 4a. In the present example, the RF generator 30 is operated with a peak-to-peak RF voltage of 3500 volts and results in an average DC potential at the target 28 surface of —850 volts. The target 28 to substrate 34 separation is about 1.1 inches, and the magnetic field coil 42 is adjusted to have a magnetic flux density of 25 gauss. As a result, the transparent film 60 is sputter deposited on the substrate 34 at a rate of about 150 A. per minute. It should be noted that the conditions mentioned above are flexible, and can be varied with a wide degree of freedom. The only limiting requirement is that the maximum deposition rate should not exceed about 750 A. per minute because the film will recrystallize at faster rates of deposition, and that will destroy the surface uniformity of the film 60. The deposition rate can be increased by increasing: the target 28 diameter, the gas pressure, the RF voltage, the magnetic flux density, and by decreasing the target 28 to substrate 34 separation or any combination of these parameters. When a film 60 of the desired thickness has been obtained, the shutter 36 is closed and the target 28 sputtering is stopped.

The substrate 34 containing the transparent film 60 is then heated in an oxygen atmosphere to form a stoichiometric oxide layer 62 on the surface of the film 60 (FIG.

4b), where the thickness of the oxide layer 62 is self-limiting with temperature. In particular, the oxygen annihilates the high conductivity, anion vacancies near the surface of the film 60 and forms a low conductivity, anion full, oxide layer 62; however, the thickness of the oxide layer 62 is a function of the heating temperature. Thus, as soon as the limiting thickness of the oxide layer 62 has been reached at a specified temperature, the remainder of the high conductivity, anion-deficient, tin-doped $In_2O_3$ film under the oxide layer 62 will not be oxidized with future operation of the film in an oxygen atmosphere at all lower temperatures.

Figure 5:
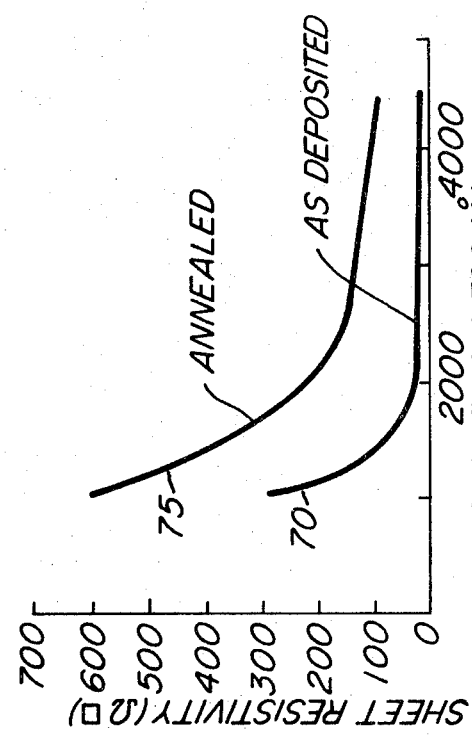
FIG. 5 is a graph which compares the sheet resistivity of an anion deficient, tin doped $In_2O_3$ film before and after annealing.

FIG. 5 is a graph which compares the sheet resistivity of films of the present example before, curve 70, and after, curve 75, annealing as a function of the film thickness. The films were annealed by heating them to 550° C. for two hours in air and then cooled. For a typical film 2000 A. thick, the sheet resistivity is about 28 ohms per square as deposited and about 200 ohms per square after annealing. Subsequent resistivity measurements after exposure to an oxygen atmosphere at all lower temperatures have shown that the films were stable and that the resistivity did not increase. Additionally, the resistivity of the annealed films did not return to the high resistivity of the totally oxidized, stoichiometric films. Comparing FIGS. 5 and 3 for a film 1000 A thick, it is seen that the film of the present invention has a sheet resistivity of about 300 ohms per square as deposited and 600 ohms per square after annealing; whereas, the totally oxidized film has a sheet resistivity of about 3000 ohms per square or about six times greater resistivity than the annealed film. Thus, the stoichiometric oxide layer 62 serves a passivating effect and prevents further oxidation of the remainder of the high-conductivity, anion-deficient film 60 at all lower temperatures.

Figure 6:
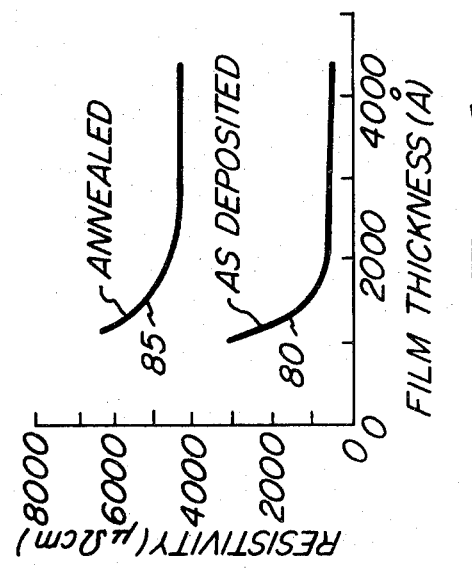
FIG. 6 is a graph which plots the bulk resistivity as a function of thickness for films of the present invention before and after annealing.
Figure 7:
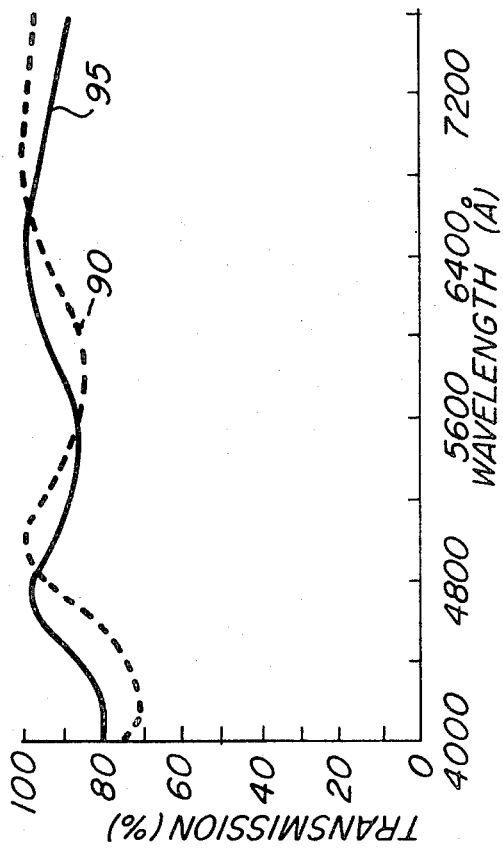
FIG. 7 is a graph which compares the light transmission of a film of the present invention before and after annealing.

FIG. 6 is a graph which plots the bulk resistivity of films of the present invention, before, curve 80, and after, curve 85, annealing, as a function of the film thickness. As seen from FIG. 6, the bulk resistivity decreases with increasing thickness and becomes constant for thicknesses greater than about 2000 A. Thus, to obtain films having the optimum conductivity and light transmission, the films should have a thickness of about 2000 A. since the light transmission decreases with increasing film thickness. A film 2000 A thick has a bulk resistivity of 625 $\mu$ohm cm. as deposited and 4600 $\mu$ohm cm. after annealing. In contrast, the prior art antimony doped tin oxide films of comparable thickness exhibit resistivities three to four times higher than these values. FIG. 7 is a graph which plots the light transmission as a function of wavelength of a 2000 A. film of the present invention before, curve 90, and after, curve 95, annealing. As mentioned above, the film has a resistivity of 28 ohms per square as deposited, curve 90, and 200 ohms per square after annealing, curve 95, at 550° C. in air for two hours. As shown in FIG. 7, the transmission of the film was generally well above the 80% minimum transmission required for liquid crystal displays. The effect of annealing on transmission was to shift the peaks to lower wavelengths, but the average transmission over the visible range of wavelengths remained essentially unchanged. In summary, 2000 A. thick films of the present invention satisfy the basic minimum conductivity and transmission requirements for liquid crystal displays.

Additionally, the films of the present invention have a uniform composition and complete surface smoothness. Since the metal oxide targets 28 have a much higher melting point, there is no diffusion of the target material as the target 28 is radio-frequency sputtered; and consequently, the composition of the deposited film remains uniform during the deposition. Also, the target 28 does not spatter drops of metal onto the substrate 34 surface, as was the case with DC sputtering of low melting point metal alloys in an oxygen atmosphere. Also, by radio-frequency sputtering the metal oxide target 28 in an inert gas atmosphere, much greater control is allowed in chemically reducing the sputtered material so that the degree and control of the anion vacancies is much more accurately regulated.

Example II

This example is essentially the same as Example I; however, a series of other donor dopants have been substituted for the tin in the anion deficient $In_2O_3$ films of the present invention. Films were prepared using antimony, bismuth, lead and titanium as the donor dopant. The films were deposited in the same manner as described in Example I and were then exposed to an oxidizing atmosphere for two hours at 550° C. The table shown below compares the characteristics of the four dopants of this example and the tin doped film of Example I. The table lists the dopant compounds and their percentage concentration in the target 28.

CHARACTERISTICS OF DONOR DOPED, ANION DEFICIENT $In_2O_3$ FILMS
[For films 2,500 A. thick]

| Dopant | Concentration (mole percent) | Resistivity (ohm cm.) | Average transmission (percent) |
|---|---|---|---|
| $SnO_2$ | 20 | $6.25 \times 10^{-4}$ | 93 |
| $Sb_2O_3$ | 10 | $2 \times 10^{-2}$ | 88 |
| $Bi_2O_3$ | 10 | $2 \times 10^{-1}$ | .5 |
| $PbO_2$ | 20 | $4.5 \times 10^{0}$ | 23 |
| $TiO_2$ | 20 | $7.5 \times 10^{+1}$ | 96 |

After the measurements were made, the films were then heated to 550° C. for two hours and the resistivity measurements were taken again. In all cases, the resistivity was constant and did not increase with the subsequent exposure to an oxygen atmosphere at the heating temperature. Thus, the $In_2O_3$ films maintain their passivating effect independent of the donor dopant used. However, the conductivity and transmission of the present films was not as good as that of the tin doped films of Example I. As shown in the table above, the antimony and titanium doped films have adequate transmissions, but the antimony doped film was the only one which had anything close to an adequate conductivity.

What is claimed is:

1. A method of fabricating a transparent conductor comprising:
    (a) depositing an anion deficient, donor doped with tin or antimony, $In_2O_3$ film on a substrate by radio-frequency sputtering a donor doped $In_2O_3$ target in an inert gas atmosphere to chemically reduce the sputtered material, thereby producing an anion deficient film; and
    (b) heating said film in an oxidizing atmosphere to form a stoichiometric oxide layer on the surface of said film, the thickness of which is self-limiting with temperature.

2. A method of fabricating a transparent conductor as in claim 1 wherein said donor dopant is tin.

3. A method of fabricating a transparent conductor as in claim 1 wherein said target comprises a mixture of about 80 mole percent $In_2O_3$ and about 20 mole percent $SnO_2$.

4. A method of fabricating a stable, high conductivity, transparent conductor comprising:
    (a) preparing a target comprising a mixture of 80 mole percent $In_2O_3$ and 20 mole percent $SnO_2$;
    (b) positioning said target and a substrate in a vacuum system;
    (c) radio-frequency sputtering said target in an inert gas atmosphere so that the sputtered material is chemically reduced by said gas and deposits upon the substrate as a high conductivity, anion deficient, tin doped $In_2O_3$ film; and
    (d) stabilizing the resistivity of said film by heating said film in an oxidizing atmosphere to form a stoichiometric, anion full, oxide layer on the surface of said film, where the thickness of said oxide layer is self-limiting with temperature so that the remainder of said high conductivity, anion deficient, tin doped $In_2O_3$ film under said oxide layer is not oxidized with future operation at lower temperatures.

References Cited

UNITED STATES PATENTS

| | | | |
|---|---|---|---|
| 2,825,687 | 3/1958 | Preston et al. | 204—192 |
| 3,506,556 | 4/1970 | Gillery et al. | 204—192 |
| 3,630,873 | 12/1971 | Moore et al. | 204—192 |

FOREIGN PATENTS

| | | | |
|---|---|---|---|
| 565,153 | 10/1958 | Canada | 204—192 |
| 566,773 | 12/1958 | Canada | 204—192 |

JOHN H. MACK, Primary Examiner

S. S. KANTER, Assistant Examiner

U.S. Cl. X.R.

117—211